United States Patent [19]

McLean

[11] 4,154,091
[45] May 15, 1979

[54] TANK TIGHTNESS TEST APPARATUS

[76] Inventor: Frederick R. McLean, 333 N. Ocean Blvd., Deerfield Beach, Fla. 33441

[21] Appl. No.: 902,553

[22] Filed: May 3, 1978

[51] Int. Cl.² ............................................. G01M 3/26
[52] U.S. Cl. .................................................. 73/49.2
[58] Field of Search ...................... 73/49.2, 49.3, 49.5, 73/49.8, 49.1, 40.5 R; 138/93, 90

[56] References Cited

U.S. PATENT DOCUMENTS

| 2,232,199 | 2/1941 | Bald | 138/90 X |
|---|---|---|---|
| 2,908,299 | 10/1959 | Gosselin | 138/90 X |
| 3,580,055 | 5/1971 | White | 73/49.2 |
| 3,726,319 | 4/1973 | Patterson | 73/49.8 X |

Primary Examiner—Charles A. Ruehl
Assistant Examiner—Joseph W. Roskos

Attorney, Agent, or Firm—Oltman and Flynn

[57] ABSTRACT

In a tank system tightness tester of the general type disclosed in U.S. Pat. No. 3,580,555, a vertically elongated, flexible and resilient, annular diaphragm is provided for sealing against the fill pipe going down into the underground storage tank. The diaphragm is clamped to the outside of an adapter sleeve. The diaphragm is radially expandable by air pressure supplied to the space between this adapter sleeve and a concentric inner sleeve. A plate assembly at ground level suspends these sleeves and a suction tube inside the fill pipe. This plate assembly also supports an air supply valve, an air vent valve and an air pressure gauge for the sealing diaphragm, quick-disconnect coupling members for tank fluid recirculating and hydraulic pressure control parts of the apparatus, and an electrical connector for the temperature measuring part of the apparatus.

10 Claims, 5 Drawing Figures

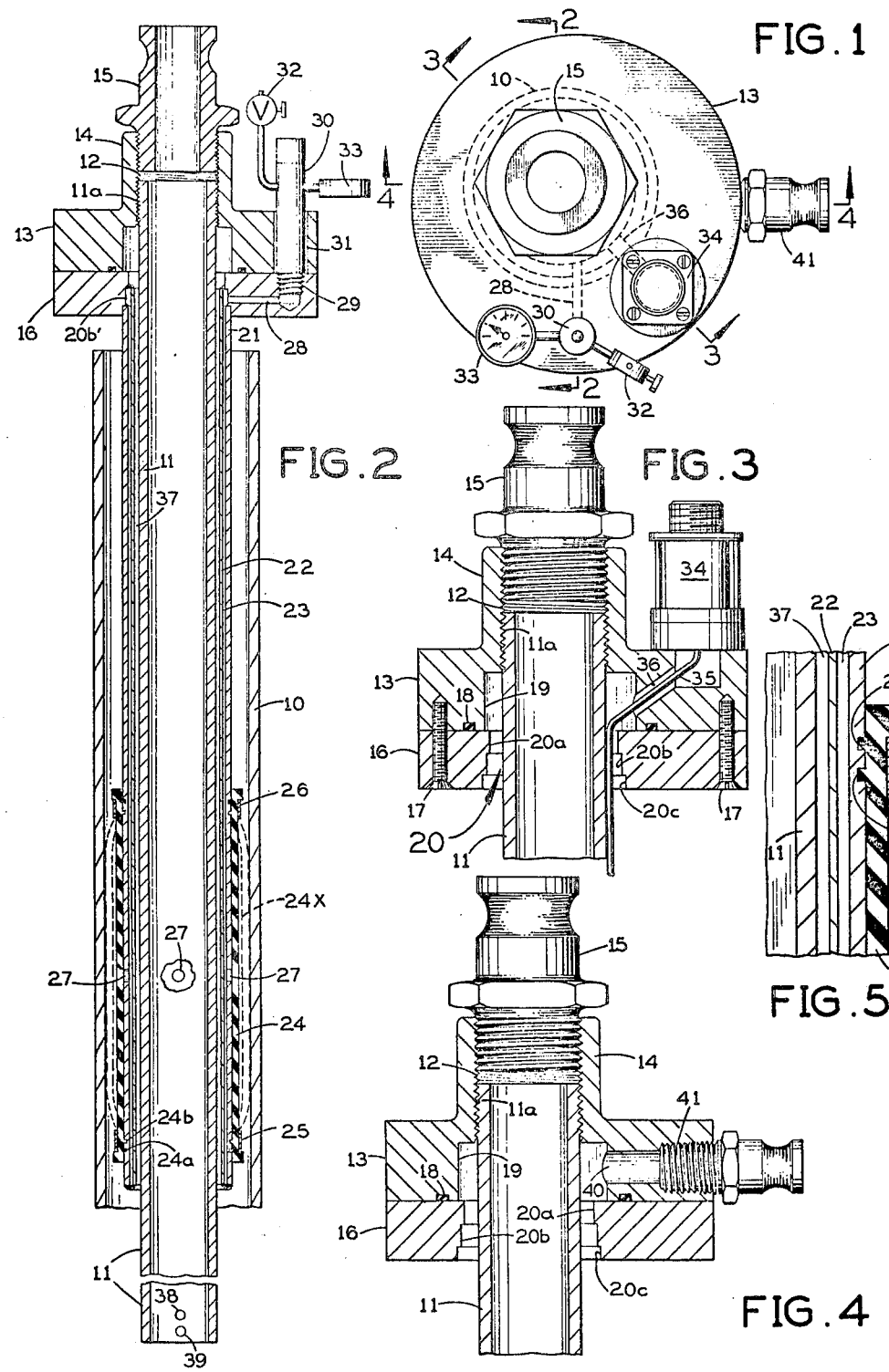

TANK TIGHTNESS TEST APPARATUS

BACKGROUND OF THE INVENTION

U.S. Pat. No. 3,580,055 to Richard B. White discloses a test apparatus for measuring the tightness of tanks, particularly underground fuel storage tanks. That apparatus has concentric suction and discharge tubes which extend down through the fill pipe into the underground tank and a pump at ground level connected to the upper ends of those tubes to provide a continuous recirculation of the fuel out of and back into the tank. A temperature sensor is provided on the lower end of the suction tube. At ground level the apparatus has a calibrated standpipe for controlling the hydrostatic pressure of the fluid in the tank. An adapter sleeve extends part way down into the fill pipe around the outside of the suction tube. A radially expandable annular seal of short vertical extent on the outside of the adapter sleeve is operated by a handle at ground level to provide a seal between the adapter sleeve and the inside of the fill pipe. Extensive practical experience has shown that this seal arrangement is not entirely satisfactory in many installations, and had to be supplemented with a similar seal of larger diameter and other fittings.

SUMMARY OF THE INVENTION

The present invention is directed primarily to a novel expandable seal arrangement on the outside of the suction tube in an apparatus of the same general type as disclosed in the aforementioned patent. The seal arrangement of the present invention includes a flexible and resilient annular diaphragm of appreciable vertical length clamped to the outside of an adapter sleeve above and below openings in the latter. An inner sleeve extends down with slight clearance inside the adapter sleeve and at their upper ends (at ground level) the space between them is connected to an air inlet valve. When pressurized air is introduced through this valve it forces the elongated annular diaphragm radially outward into fluid-tight sealing engagement with the inside of the fill pipe for the underground tank.

The adapter sleeve and the inner sleeve are suspended from a plate assembly at ground level, from which the suction tube also is suspended. The plate assembly physically supports an air inlet valve for supplying pressurized air to the diaphragm, an air pressure gauge for the diaphragm, and an air vent valve for venting the diaphragm to the atmosphere, when desired. The plate assembly also carries hydraulic quick-disconnect adapter members for the upper end of the suction tube and for the standpipe in the static pressure measuring part of the apparatus.

A principal object of this invention is to provide a novel and improved arrangement in a tank tightness testing apparatus for sealing the inside of the fill pipe leading down into the tank being tested.

Another object of this invention is to provide in such an apparatus a novel structural assembly which enables the suction tube and the fill pipe sealing arrangement to be handled conveniently for insertion into or removal from the fill pipe and which provides various hydraulic and air connections required at ground level.

Further objects and advantages of this invention will be apparent from the following detailed description of a presently-preferred embodiment thereof, which is shown in the accompanying drawing in which:

FIG. 1 is a top plan view of the apparatus of the present invention;

FIG. 2 is a vertical section through this apparatus, taken along the line 2—2 in FIG. 1;

FIG. 3 is a vertical section of the upper end of this apparatus, taken along the line 3—3 in FIG. 1;

FIG. 4 is a similar view taken along the line 4—4 in FIG. 1; and

FIG. 5 is an enlarged fragmentary, vertical section showing the normal positions of the sealing diaphragm, adapter sleeve, inner sleeve and suction tube at the upper end of the diaphragm before inflation.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

Referring to FIG. 2, reference numeral 10 designates the fill pipe which extends from ground level down into the top of an underground fuel storage tank (not shown). The test apparatus has a vertically elongated suction tube 11 which extends down through the fill pipe 10 into the underground tank for the same purpose as described in U.S. Pat. No. 3,580,055. The suction tube preferably is concentric with the fill pipe and is of substantially smaller diameter so that it has an appreciable spacing from the inside of the fill pipe. The test apparatus has a discharge tube (not shown) which extends concentrically down through the suction tube 11 to a location close to the bottom of the underground tank. A pump at ground level has its inlet connected to the upper end of the suction tube 11 and its outlet connected to the upper end of the discharge tube for continuously recirculating the fuel in the tank in the same manner and for the same purpose as described in the aforementioned patent.

As shown in FIG. 2, the upper end of the suction tube is externally screw-threaded at 11a and is threadedly received in the lower end of a screw-threaded vertical opening 12 formed in an annular upper plate 13 at ground level above the upper end of the fill pipe 10. The screw-threaded opening 12 is formed in this plate. The upper end of this opening threadedly receives the screw-threaded lower end of a quick-disconnect fluid adapter member 15 of known design. There may be a boss 14, or the plate 13 may be made thicker than shown to receive the thread. The inlet of the recirculating pump is connected through a hose to a complementary quick-disconnect coupling member (not shown) which is manually attachable to the upper end of adapter member 15 in the usual manner. With this arrangement, the suction tube is rigidly suspended vertically from the plate 13 and the upper end of its passageway may be connected to the inlet of the recirculating pump.

An annular, flat, lower plate 16 is attached to the bottom of the upper plate 13 by screws 17 (FIG. 3). An O-ring 18 of rubber-like material is seated in a groove in the bottom of the upper plate 13 and it is deformed against the top of the lower plate 16 to provide a fluid-tight seal between the two plates when the screws 17 are tightened. This O-ring extends around a cylindrical counterbore 19 in the lower end of the upper plate which leads up into the latter's screw-threaded opening 12.

The lower plate 16 has a vertical opening 20 which leads up into the counterbore 19 in the bottom of the upper plate 13. This opening 20 is of stepped configuration, with an upper end segment 20a of smaller diameter than an intermediate segment 20b midway along its height, and a lower end segment 20c of larger diameter than the intermediate segment 20b. The suction tune 11 extends down through this bottom plate opening 20 and is spaced throughout from the sidewalls of this opening.

In accordance with the present invention a rigid, vertically elongated, cylindrical adapter sleeve 21 (FIG. 2) has its upper end snugly received in the lower end segment 20c of the opening 20 in the bottom plate 16 and is welded or otherwise permanently affixed to it. An inner sleeve 22 of slightly smaller outside diameter than the inside diameter of the adapter sleeve 21 has its upper end welded to the lower plate at the shoulder between the upper end segment 20a and the intermediate segment 20b of its opening 20. Thus, the upper end of the inner sleeve 22 projects above the upper end of the adapter sleeve 21, and an annular space 20b' is formed between the sidewall of the plate opening 20 at its intermediate segment and the outside of the inner sleeve. The inner sleeve 22 extends concentrically down through the adapter sleeve 21, so that a small annular air passageway 23 is provided between them (FIG. 5). The aforementioned annular space 20b' at their upper ends leads down into the space 23 between the sleeves. At their lower ends the sleeves are bonded to each other in any suitable fashion to provide an air-tight closure there for the annular space 23 between them.

A vertically elongated, annular, flexible and resilient diaphragm 24 of rubber-like material is clamped in airtight fashion around the outside of the adapter sleeve 21. In one practical embodiment the lower end of this diaphragm is a fraction of an inch above the sealed lower ends of the sleeves. At this location the diaphragm has a pair of radially inwardly projecting, annular ribs 24a and 24b which are snugly received in complementary annular grooves formed in the outside of the adapter sleeve. A locking ring 25 clamps the diaphragm against the adapter sleeve in air-tight fashion at these interfitting ribs and grooves.

A similar arrangement, shown in enlarged detail in FIG. 5, is provided adjacent the upper end of the diaphragm to clamp it in air-tight fashion around the outside of the adapter sleeve. As shown in this Figure, at this location the diaphragm has inwardly protruding annular ribs 24c and 24d which are held tightly in complementary grooves in the outside of the adapter sleeve 21 by an upper locking ring 26.

In one practical embodiment the vertical length of the diaphragm 24 between the upper and lower locking rings 25 and 26 is substantially 8 inches.

The adapter sleeve 21 is formed with several openings 27 (FIG. 2) midway along the vertical length of the diaphragm 24 to enable air pressure in the annular space 23 between the adapter sleeve 21 and the inner sleeve 22 to be applied to the inside face of the diaphragm for expanding the diaphragm radially outward, as shown in phantom in FIG. 2.

In its normal, unexpanded state the diaphragm 24 fits closely around the outside of the adapter sleeve 21 and has a loose fit inside the fill pipe 10, with a substantial clearance between them as shown in full lines in FIG. 2. However, air pressure supplied to the annular space between the sleeves 21 and 22 can expand the diaphragm radially outward into fluid-tight sealing engagement with the inside of the fill pipe 10, as shown in phantom at 24x in FIG. 2. Such engagement takes place over almost the entire vertical length of the diaphragm, so that a very effective seal is provided.

For supplying pressurized air to the space 23 between the sleeves 21 and 22 the lower plate 16 is formed with a transverse air passage 28 (FIG. 1) which intersects the aforementioned annular space 20b' outside the upper end of the inner sleeve 21 and thus communicates with the annular space 23 between the sleeves at their upper ends. The lower plate 16 has a screw-threaded vertical recess 29 leading down into the transverse air passage 28. An air inlet valve 30 of known design has an externally screw-threaded lower end threadedly received in this recess 29 so that this inlet air valve is physically supported by the lower plate 16. The housing of this inlet air valve extends up loosely through a cylindrical vertical opening 31 in the upper plate 13 which registers with the screw-threaded recess 29 in the lower plate.

Preferably, as shown schematically in FIG. 1, the housing of the air inlet valve 30 physically supports a manually operated, normally-closed air vent valve 32 and an air pressure gauge 33 with an upwardly-facing dial which can be viewed by a person at ground level looking down on it. Both the air vent valve 32 and the air pressure gauge 33 communicate with the air passage 28 below the valve element and the valve seat of the air inlet valve 30. Therefore, the air pressure gauge 33 gives a continuous reading of the air pressure in the annular space 23 between the adapter sleeve 21 and the inner sleeve 22, and the air vent valve 32 can vent this space to the atmosphere whenever valve 32 is opened.

With the air vent valve 32 in its normally-closed condition, whenever an air hose leading from a suitable air pressure source at the service station is attached to the upper end of the air inlet valve 30, it automatically unseats the valve element from the valve seat in valve 30 in the usual manner and air pressure is applied to the inside of the diaphragm 24 via the transverse passage 28 in the lower plate 16, the annular space 23 between sleeves 21 and 22, and the openings 27 in the adapter sleeve 21. Any suitable air source may be used.

Referring to FIG. 3, an electrical connector or fitting 34 of known design is mounted on top of the upper plate 13 at one side of the quick-disconnect hydraulic coupling member 15. Insulated electrical conductors 35 extend down from this connector through a diagonal bore 36 in the upper plate to the latter's counterbore 19, and from here the conductors pass down snugly through the opening 20 in the lower plate 16 into a space 37 (FIG. 5) between the suction tube 11 and the inner sleeve 22. At the lower end of the suction tube these conductors are connected to the terminals 38, 39 of a temperature sensor, preferably, a thermistor, on the inside of the suction tube which is exposed to the fuel flowing from the underground tank up into the suction tube 11. An accurate temperature measuring device (not shown) is connected to the electrical fitting 34 on the upper plate 13 to provide at a convenient location above ground a visual reading of the fuel temperature as sensed by the thermistor inside the lower end of the suction tube 11.

Referring to FIG. 4, the upper plate 13 is formed with a transverse horizontal fluid passage 40 which leads from the counterbore 19 to a quick-disconnect hydraulic adapter member 41, which projects from the upper plate 13 at one side. A standpipe as shown in U.S. Pat. No. 3,580,055 may be connected to the quick-disconnect adapter member 41 through a mating quick-disconnect coupling member with or without a hose or pipe, all for the same purpose as explained in that patent.

From the foregoing detailed description it will be apparent that the attached plates 13 and 16 provide physical, structural supports and hydraulic and pneumatic connections for the suction tube 11, inner sleeve 22, adapter sleeve 21 and sealing diaphragm 24, which are suspended inside the underground tank's fill pipe 10 by this plate assembly. The plate assembly 13, 16 also physically supports the air inlet valve 30, air vent valve 32 and air pressure gauge 33, the electrical connector 34 for the fuel temperature sensor inside the lower end of the suction tube 11, the hydraulic connector 15 for the suction tube 11 and the hydraulic connector 41 for the standpipe. Thus, this arrangement provides a unitary structural assembly which can be conveniently handled at ground level for insertion into or removal from the underground tank's fill pipe.

The principal advantage of the sealing diaphragm 24 is the more effective and reliable seal it provides for the fill pipe when the tank tightness test is being conducted. This diaphragm is engageable with the inside of the fill pipe over a much greater sealing area extending over a substantial part of the fill pipe's vertical length, and the actuation of the diaphragm by air pressure (which is readily available at the test site) also is more reliable than a mechanical actuating arrangement for a sealing ring. Also, with this sealing diaphragm an effective seal can be provided for a wider variety of different sized fill pipes.

If desired, the diaphragm 24 may be formed with a plurality of outwardly projecting ribs on the outside to provide several sealing engagements with the inside of the fill pipe 10 when the diaphragm is expanded. These external ribs may be closely spaced horizontal ribs or diagonal ribs. The rings 25 and 26 are displaceable toward the center of the diaphragm which makes it easy to remove and replace the diaphragm.

I claim:

1. In a tightness testing apparatus for an underground tank provided with a fill pipe extending from ground level down to the tank, said apparatus having:
   a suction tube which is insertable loosely down through the fill pipe into the tank;
   a discharge tube extending down through the suction tube into the tank;
   pump means for discharging fluid into the tank through said discharge tube and for withdrawing fluid from the tank through said suction tube around the outside of said discharge tube;
   and an adapter sleeve encircling the upper end of said suction tube inside the fill pipe; the improvement which comprises:
   a vertically elongated, annular, flexible and resilient, radially expandable diaphragm secured around the outside of said adapter sleeve, said diaphragm in its normal unexpanded state having a loose fit inside the fill pipe;
   said adapter sleeve having openings therein which provide air communication with the inside of said diaphragm;
   and means inside said adapter sleeve for passing pressurized air from a ground level source to said openings in the adapter sleeve for expanding the diaphragm radially outward into fluid-tight sealing engagement with the inside of the fill pipe over an appreciable vertical distance along the fill pipe;
   said means for passing pressurized air comprising:
   an inner sleeve extending around the outside of said suction tube down into said adapter sleeve and spaced therefrom;
   and an air inlet valve at ground level for introducing pressurized air between said inner sleeve and said adapter sleeve at their upper ends.

2. An apparatus according to claim 1, wherein said means for passing pressurized air also comprises:
   a plate having a vertical opening which receives the upper ends of said adapter sleeve and said inner sleeve, said plate being rigidly attached to the upper ends of said sleeves and suspending the sleeves in substantially concentric relationship, said plate having a transverse passage leading from said air inlet valve to said vertical opening and communicating thereat with the annular space between said sleeves.

3. An apparatus according to claim 2, wherein said air inlet valve is physically supported by said plate and extends upward therefrom.

4. An apparatus according to claim 3, and further comprising:
   a normally closed, manually operated, air bleed valve supported by and operatively connected to said air inlet valve for selectively releasing the air pressure acting on the diaphragm;
   and an air pressure gauge supported by and operatively connected to said air inlet valve and having an upwardly facing dial for visually indicating the air pressure acting on the diaphragm.

5. An apparatus according to claim 4, and further comprising:
   an upper plate overlying said first-mentioned plate and having a screw-threaded vertical opening which registers with said vertical opening in the first-mentioned plate;
   said suction tube having a screw-threaded upper end which is threadedly received in the lower end of said opening in the upper plate for rigidly suspending the suction tube from said upper plate;
   and a quick-disconnect fluid adapter member extending up from said upper plate and having a screw-threaded lower end which is threadedly received in the upper end of said screw-threaded opening in said upper plate.

6. An apparatus according to claim 5, and further comprising means providing a fluid-tight seal between said plates around said openings therein.

7. An apparatus according to claim 6 wherein:
   said diaphragm has annular, inwardly projecting ribs at its upper and lower ends;
   and said adapter sleeve has external annular grooves which snugly receive the respective ribs on the diaphragm; and further comprising:
   upper and lower locking rings extending around the outside of the diaphragm at the respective ribs and clamping the diaphragm in air-tight fashion against the outside of the adapter sleeve, said locking rings being displaceable toward the center of the diaphragm permitting easy replacement of the diaphragm.

8. An apparatus according to claim 2, and further comprising:
   an upper plate overlying said first-mentioned plate and having a screw-threaded vertical opening which registers with said vertical opening in the first-mentioned plate;

said suction tube having a screw-threaded upper end which is threadedly received in the lower end of said opening in the upper plate to be rigidly suspended from said upper plate.

9. An apparatus according to claim 8 wherein:
said diaphragm has annular, inwardly projecting ribs at its upper and lower ends;
and said adapter sleeve has external annular grooves which snugly receive the respective ribs on the diaphragm; and further comprising:
upper and lower rings extending round the outside of the diaphragm at the respective ribs and clamping the diaphragm in air-tight fashion against the outside of the adapter sleeve.

10. An apparatus according to claim 1 wherein:
said diaphragm has annular, inwardly projecting ribs at its upper and lower ends;
and said adapter sleeve has external annular grooves which snugly receive the respective ribs on the diaphragm; and further comprising:
upper and lower locking rings extending around the outside of the diaphragm at the respective ribs and clamping the diaphragm in air-tight fashion against the outside of the adapter sleeve.

* * * * *